(12) United States Patent
Schildbach et al.

(10) Patent No.: US 11,509,972 B2
(45) Date of Patent: Nov. 22, 2022

(54) METHOD AND DEVICE FOR PERSONALIZATION OF MEDIA DATA FOR PLAYBACK

(71) Applicant: Dolby International AB, Amsterdam Zuidoost (NL)

(72) Inventors: Wolfgang A. Schildbach, Nuremberg (DE); Christof Fersch, Neumarkt (DE); Holger Hoerich, Fürth (DE)

(73) Assignee: Dolby International AB, Amsterdam Zuidoost (NL)

( * ) Notice: Subject to any disclaimer, the term of this patent is extended or adjusted under 35 U.S.C. 154(b) by 18 days.

(21) Appl. No.: 16/920,456

(22) Filed: Jul. 3, 2020

(65) Prior Publication Data

US 2021/0014578 A1   Jan. 14, 2021

Related U.S. Application Data

(60) Provisional application No. 62/871,861, filed on Jul. 9, 2019.

(30) Foreign Application Priority Data

Jul. 9, 2019  (EP) .................................... 19185095

(51) Int. Cl.
  *H04L 29/08* (2006.01)
  *H04N 21/845* (2011.01)
  (Continued)

(52) U.S. Cl.
  CPC ....... *H04N 21/8456* (2013.01); *H04L 65/612* (2022.05); *H04L 65/70* (2022.05); *H04L 67/02* (2013.01); *H04N 21/26258* (2013.01)

(58) Field of Classification Search
  CPC .......... H04N 21/8456; H04N 21/26258; H04L 67/02; H04L 65/607; H04L 65/4084
  See application file for complete search history.

(56) References Cited

U.S. PATENT DOCUMENTS 6,493,748 B1 * 12/2002 Nakayama ............. H04L 29/06
    709/218
8,984,094 B2   3/2015 Green
    (Continued)

FOREIGN PATENT DOCUMENTS

WO    2014113193    7/2014

OTHER PUBLICATIONS

Berberian, Paul "How Video Streaming Works on the Web: An Introduction" pp. 1-31, Sep. 30, 2019.

(Continued)

*Primary Examiner* — Chirag R Patel

(57) ABSTRACT

Described herein is a method for processing of media data for playback, wherein the method includes the steps of: (a) fetching, by a web proxy, from two or more media servers media data and a media manifest file including metadata information relating to the fetched media data, and merging, by the web proxy, the media data; (b) modifying, by said web proxy, the content of the media manifest file and/or the content of the media data; and (c) providing, by said web proxy, the media manifest file and the media data as modified in step (b) to a media retrieval element for receiving and processing the media manifest file and the media data for decoding or playback, wherein a localhost address is assigned to the web proxy and the web proxy acts as a server for said media retrieval element. Described are further a respective device and computer program product.

21 Claims, 5 Drawing Sheets

(51) Int. Cl.
    *H04N 21/262*     (2011.01)
    *H04L 67/02*     (2022.01)
    *H04L 65/70*     (2022.01)
    *H04L 65/612*     (2022.01)

(56) References Cited

U.S. PATENT DOCUMENTS

| | | | |
|---|---|---|---|
| 9,160,779 B2 * | 10/2015 | Cherian | H04L 65/80 |
| 9,537,902 B2 | 1/2017 | Barone | |
| 9,756,098 B2 | 9/2017 | Kazerani | |
| 9,788,026 B2 | 10/2017 | Botsford | |
| 9,906,526 B2 | 2/2018 | Oyman | |
| 9,971,636 B2 | 5/2018 | Scoda | |
| RE47,612 E * | 9/2019 | Phillips | H04N 21/26258 |
| 10,897,637 B1 * | 1/2021 | Pham | H04N 21/23406 |
| 2011/0138354 A1 | 6/2011 | Hertenstein | |
| 2013/0242189 A1 | 9/2013 | Babu | |
| 2014/0040026 A1 * | 2/2014 | Swaminathan | G06Q 30/02 705/14.53 |
| 2015/0163273 A1 | 6/2015 | Radcliffe | |
| 2015/0229986 A1 | 8/2015 | Legallais | |
| 2015/0269629 A1 * | 9/2015 | Lo | H04N 21/85406 705/14.66 |
| 2015/0296274 A1 * | 10/2015 | Good | H04N 21/26258 725/93 |
| 2016/0134900 A1 * | 5/2016 | Wei | H04N 21/85406 725/32 |
| 2016/0315987 A1 * | 10/2016 | Yamagishi | H04L 67/02 |
| 2016/0337424 A1 | 11/2016 | Mandyam | |
| 2016/0337426 A1 | 11/2016 | Shribman | |
| 2016/0353148 A1 | 12/2016 | Prins | |
| 2017/0034304 A1 | 2/2017 | Venkatesh | |
| 2017/0063960 A1 | 3/2017 | Stockhammer | |
| 2017/0156015 A1 * | 6/2017 | Stockhammer | H04N 21/8456 |
| 2017/0171341 A1 * | 6/2017 | Zane | H04N 21/222 |
| 2017/0257408 A1 | 9/2017 | Gaunt | |
| 2017/0332113 A1 | 11/2017 | Haritaoglu | |
| 2017/0332116 A1 | 11/2017 | Lee | |
| 2018/0053217 A1 * | 2/2018 | Yamagishi | G06Q 30/0269 |
| 2018/0069856 A1 | 3/2018 | Oyman | |
| 2018/0176278 A1 * | 6/2018 | Mandyam | H04N 21/435 |

OTHER PUBLICATIONS

George, L. et al "Internet-Delivered Television Using MPEG-DASH: Opportunities and Challenges" Research Gate, Jan. 2015.
Rainer, B. et al "A Seamless Web Integration of Adaptive HTTP Streaming" EUSIPCO 20th, Bucharest, Romania, Aug. 27-31, 2012, pp. 1519-1523.

* cited by examiner

METHOD AND DEVICE FOR PERSONALIZATION OF MEDIA DATA FOR PLAYBACK

CROSS-REFERENCE TO RELATED APPLICATIONS

This application claims priority of the following priority applications: U.S. provisional application 62/871,861 filed 9 Jul. 2019 and EP application 19185095.7 filed 9 Jul. 2019, each of which is incorporated by reference in its entirety.

TECHNOLOGY

The present disclosure relates generally to a method for processing of media data for playback, and more specifically to modifying the content of a media manifest file and/or media data by a web proxy.

While some embodiments will be described herein with particular reference to that disclosure, it will be appreciated that the present disclosure is not limited to such a field of use and is applicable in broader contexts.

BACKGROUND

Any discussion of the background art throughout the disclosure should in no way be considered as an admission that such art is widely known or forms part of common general knowledge in the field.

The hypertext transfer protocol (HTTP) and the Dynamic Adaptive Streaming over HTTP (DASH) protocol represent examples of a standardized protocol being used for streaming of media content via the Internet. In dynamic adaptive streaming over HTTP (DASH), media data in a stream are represented as segments and delivered as such to a client device. A media presentation description (MPD) metadata file may provide information on structure and different alternatives of media content representations stored on a server including information on bitrates, frame rates, resolution or codec. The MPD file may also provide information on a segment type or format and the relation of respective segments, such as, for example, initialization segments and media segments. In this, the MPD file may allow mapping segments into a media presentation on a client device.

An MPD file can be temporally divided into periods of a predetermined length, wherein each period may include a plurality of adaption sets. An adaption set may include a plurality of media content representations according to different alternatives encompassing representations at different bitrates, mono, stereo or surround sound as well as different languages. Each representation may further include segment information such as information on an initialization segment and on one or more media segments including media data in the respective period.

For the playback of streaming content delivered via the internet, over-the-top players (OTT players) are often used without the need of subscribing to traditional satellite or pay TV service. It has been observed that OTT players are increasingly more often implemented as, for example, JavaScript, running in a browser.

In general, media playback inside a browser is built upon an application programming interface (API) provided by a media (retrieval) element, for example, a HTML5 element. In a media player, the API provides only very simple playback capabilities such as, for example, a play(URL) call where a URL/web address is handed down to a media engine. In this configuration, data are directly passed to a decoder, without passing the calling block.

In some cases, manipulation of data may, however, be necessary before it reaches the decoder, for example, to personalize said data in accordance with the preferences of a user. A simple API may not be sufficient in such cases.

Advanced API, however, exist that allow for manipulation of media, but these API may not always be available or may not provide the necessary capabilities. Specifically, in HbbTV, which recently adopted next generation audio and personalization, such an API may not be available and respective players, for example "HbbTV apps" do not employ it to remain compatibility with all devices.

Thus, in view of the above, there is an existing need for a method and device that allow manipulation of media manifest files and/or media data for personalized playback.

SUMMARY

In accordance with a first aspect of the present disclosure there is provided a method for processing of media data for playback. The method may include the step of (a) fetching, by a web proxy, from two or more media servers media data and a media manifest file including metadata information relating to the fetched media data, and merging, by the web proxy, the media data. The method may further include the step of (b) modifying, by said web proxy, the content of the media manifest file and/or the content of the media data. And the method may include the step of (c) providing, by said web proxy, the media manifest file and the media data as modified in step (b) to a media retrieval element for receiving and processing the media manifest file and the media data for decoding or playback, wherein a localhost address is assigned to the web proxy and the web proxy acts as a server for said media retrieval element.

In some embodiments, in step (a) fetching, by the web proxy, from the two or more media servers the media data and the media manifest file may be initiated by a play call from a media player application to the media retrieval element.

In some embodiments, the web proxy may be implemented in JavaScript.

In some embodiments, a ServiceWorker concept may be used to implement the web proxy.

In some embodiments, the web proxy may be part of the media player application.

In some embodiments, the method may further include analyzing the media data by said web proxy, wherein modifying the content of the media manifest file may be based on a result of the analysis.

In some embodiments, analyzing the media data may include reading and/or fragmenting the media data, wherein modifying the content of the media manifest file may include (auto-) generating a new media manifest file and replacing the fetched media manifest file by the new media manifest file.

In some embodiments, modifying the content of the media data may include editing information on a media initialization segment, wherein said media initialization segment may contain information required for the initialization of a decoder.

In some embodiments, modifying the content of the media manifest file may include rewriting the media manifest file.

In some embodiments, the media manifest file may include information linking portions of the media data to one or more personalization settings.

In some embodiments, modifying the content of the media manifest file may be based on a selection of the one or more personalization settings.

In some embodiments, the personalization settings may include one or more of a setting relating to language, a setting relating to personalized advertising, a setting relating to content-specific commentary, a setting relating to audio description for visually-impaired, a setting relating to other accessibility related features, and a setting relating to balancing of dialogue versus non-dialogue audio.

In some embodiments, the selection of the one or more personalization settings may be based on a user input.

In some embodiments, the media data may be audio, and may be encoded into a compressed format. In some embodiments, the media data may be present in MPEG-H Audio format, DTS format, DTS-x format, AC-4 format, AC-3 format, E-AC-3 format, AAC format or HE-AAC format.

In accordance with a second aspect of the present disclosure there is provided a device having implemented a web browser, wherein the web browser may be configured to receive instructions to execute the method for processing of media data for playback.

In some embodiments, to receive instructions may include to download from the web elements including one or more of the web proxy, the media retrieval element and the media player application.

In some embodiments, the web browser may be configured to interpret and execute JavaScript, wherein the downloaded elements may be implemented in JavaScript.

In some embodiments, the web browser may be configured to implement the media retrieval element.

In some embodiments, the web browser may be configured to implement the web proxy.

In accordance with a third aspect of the present disclosure there is provided a computer program product with instructions adapted to cause a device having processing capability to carry out the method for processing of media data for playback.

BRIEF DESCRIPTION OF THE DRAWINGS

Example embodiments of the disclosure will now be described, by way of example only, with reference to the accompanying drawings in which.

DESCRIPTION OF EXAMPLE EMBODIMENTS

Personalization of Media Data for Playback

In the following, method and device will be described for processing of media data for playback. By the described method and device, in a streaming process, data manipulation is possible where advanced API players are not reliably available. Further, also streams obtained from two or more different sources can be processed. To achieve this, a so-called "man in the middle" approach is realized by building and implementing a web proxy, specifically a JavaScript web proxy, that proxies all media before being transferred to decoding or playback, for example, by a media retrieval element, such as a HTML5 element. The web proxy fetches data from the internet and manipulates the data before providing it for decoding or playback. The web proxy can further fetch data from two or more different sources and merge them into a single stream.

By applying this so-called "man in the middle" approach it is possible to bypass an existing API and, at the same time, to personalize the playback of media content by a media player application. In this, an immersive and personalized playback experience can be provided for a user.

Method for Personalization of Media Data for Playback

Figure 1:
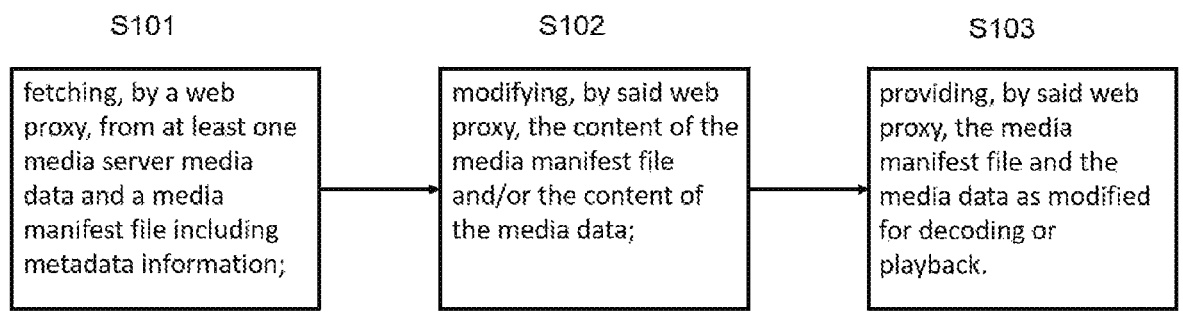
FIG. 1 illustrates a flow diagram of an example of a method for processing of media data for playback.

Referring to the example of FIG. 1, in step S101, a web proxy fetches from at least one, e.g. two or more, media server media data and a media manifest file including metadata information relating to the fetched media data, for example an MPD file (media presentation description file). The web proxy then subsequently merges the media data from the two or more media servers. By merging the media data from the two or more media servers, the web proxy can bridge a gap where an existing API only allows traversal of one stream.

While the format of the fetched media data is not limited, in an embodiment, the media data may be present in MPEG-H Audio format or AC-4 format.

Referring again to the example of FIG. 1, in step S102, the content of the media manifest file and/or the content of the media data are modified by the web proxy. In the context of this disclosure, the term "modifying" is to be interpreted broadly and may include in a non-limiting way, in addition to the embodiments detailed below, deleting, inserting, editing, rewriting or replacing at least a part of the content of the media manifest file.

In an embodiment, modifying the content of the media data may include editing information on a media initialization segment, wherein said media initialization segment may contain information required for the initialization of a decoder. Editing the media initialization segment may thus allow personalization of playback of media data by enabling decoder control.

In an embodiment, modifying the content of the media manifest file may include rewriting the media manifest file. In rewriting the media manifest file, the content of the media manifest file is revised as a whole in relation to the media data the media manifest file references.

In this context, editing the media initialization segment and/or rewriting the media manifest file may indicate a selection of personalization settings. In an embodiment, the media manifest file may include information linking portions of the media data to one or more personalization settings. For example, in the form of one or more representations included in respective adaption sets in an MPD file.

In an embodiment, modifying the content of the media manifest file may be based on a selection of one or more personalization settings. For example, if the media manifest file is an MPD file, representations of media content may be deleted, inserted, edited or rewritten in accordance with the selection of one or more personalization settings. A representation in an MPD file, for example, may also be replaced by a representation previously stored in relation to a personalization setting if this setting is selected.

In an embodiment, the personalization settings may include one or more of a setting relating to language, a setting relating to personalized advertising, a setting relating to content-specific commentary, a setting relating to audio description for visually-impaired, a setting relating to other accessibility related features, and a setting relating to balancing of dialogue versus non-dialogue audio.

While the content of the media manifest file may be modified automatically based on the selection of the one or more personalization settings, in an embodiment, the selection of the one or more personalization settings may be based on a user input. In this, direct user interaction for the personalization of playback of media data can be provided.

In an embodiment, the method may further include analyzing the media data by the web proxy, wherein modifying the content of the media manifest file may be based on a result of the analysis. In an embodiment, analyzing the media data may include reading and/or fragmenting the media data, wherein modifying the content of the media manifest file may include (auto-) generating a new media manifest file and replacing the fetched media manifest file by the new media manifest file. In this, a media manifest file can be newly created/(auto-)generated based on analyzing the media data, i.e. just given the media data (streams).

Referring again to the example of FIG. 1, in step S103, the media manifest file and the media data as modified in step S102 are provided by the web proxy to a media retrieval element for receiving and processing the media manifest file and the media data for decoding or playback, wherein a localhost address is assigned to the web proxy and the web proxy acts as a server for said media retrieval element. In an embodiment, in step 101 fetching, by the web proxy, from the at least one, e.g. two or more, media server the media data and the media manifest file may be initiated by a play call from a media player application to the media retrieval element. In this, the web proxy may act as "man in the middle" in between the media server and the media retrieval element allowing for the personalization of playback of streaming content by modifying the fetched media manifest file and/or the fetched media data before providing them to the media retrieval element for decoding or playback.

In an embodiment, the web proxy may be implemented in JavaScript. In an embodiment, the web proxy may be part of the media player application.

The above described method may be implemented by a device having implemented a web browser, wherein the web browser is configured to receive instructions to execute said method as detailed below. The type of the device is not limited. Any device capable of playback of media content is conceivable, for example, a device having implemented a HbbTV app. The device may include one or more processors. The device may include, for example, computers, tablet computers, notebooks, smartwatches or smartphones.

Alternatively, or additionally, the above described method may be implemented as a computer program product with instructions adapted to cause a device having processing capability to carry out said method.

Device for Personalization of Media Data for Playback

A device for personalization of media data for playback is a device having implemented a web browser, wherein the web browser is configured to receive instructions to execute the method for processing of media data for playback. In an embodiment, to receive instructions may include to download from the web elements including one or more of a web proxy, a media retrieval element, and a media player application.

Referring to the examples of FIGS. 2-5, examples of different configurations of these elements in the device are illustrated. In each of the examples of FIGS. 2-5, the web browser and the elements may be configured as follows:

1) the web browser may be configured to provide a play call method to the media retrieval element;
2) the media retrieval element may be configured to retrieve, as a consequence of the play call, a media manifest file and media data referenced by the media manifest file from the web proxy as modified;
3) the media player application may be configured to contain the play call;
4) the web proxy may be configured to act as intermediary in the connection from the media retrieval element to the, e.g. two or more, media server.

The configuration (implementation) of the above elements in the device, 1, is not limited. However, in an embodiment, the web browser may be configured to implement the media retrieval element, as detailed with reference to the examples of FIGS. 3-5 below. In a further embodiment, the web browser may be configured to implement the web proxy, as detailed with reference to the examples of FIGS. 2 and 3 below.

Figure 2:
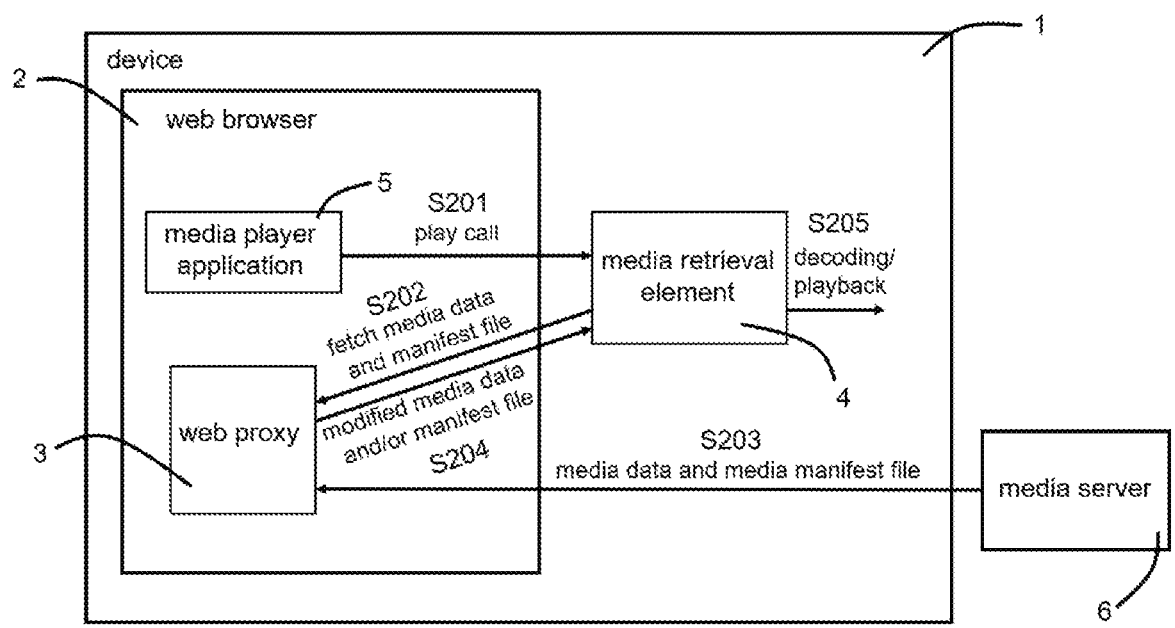
FIG. 2 illustrates an example of a configuration of elements in a device having implemented a web browser configured to receive instructions for executing a method for processing of media data for playback and a media server.

Referring to the example of FIG. 2, the media player application, 5, and the web proxy, 3, may be individually implemented within the web browser, 2, while the media retrieval element, 4, may be implemented outside the web browser, 2.

Figure 3:
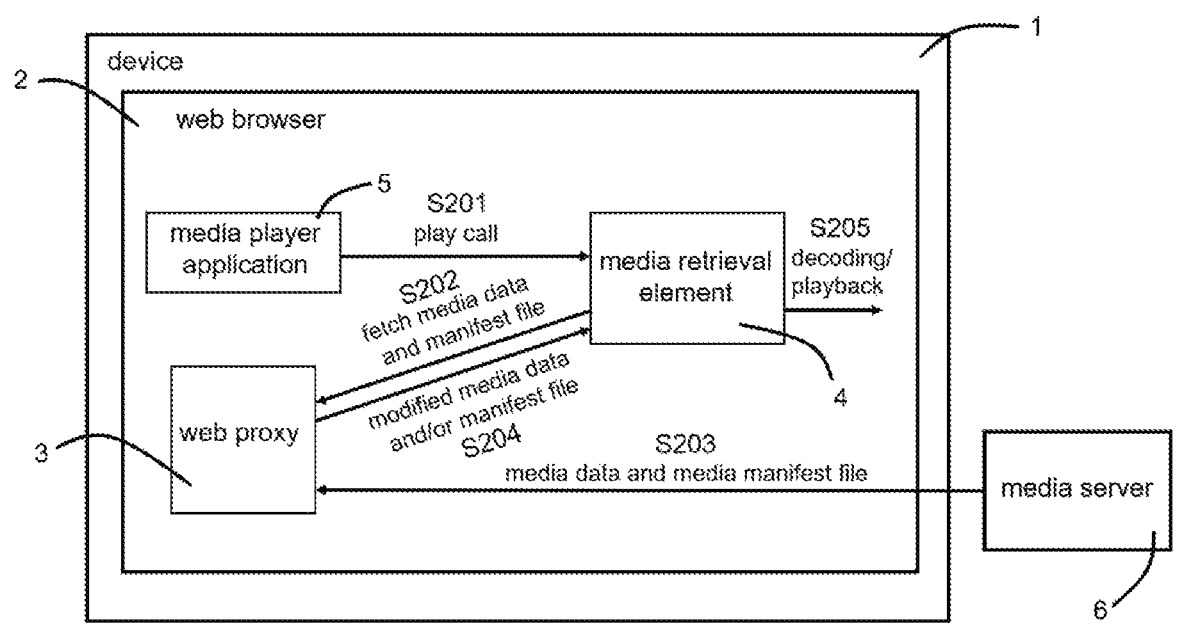
FIG. 3 illustrates a further example of a configuration of elements in a device having implemented a web browser configured to receive instructions for executing a method for processing of media data for playback and a media server.

Referring to the example of FIG. 3, the media player application, 5, the web proxy, 3, and the media retrieval element, 4, may all be individually implemented within the web browser, 2.

Figure 4:
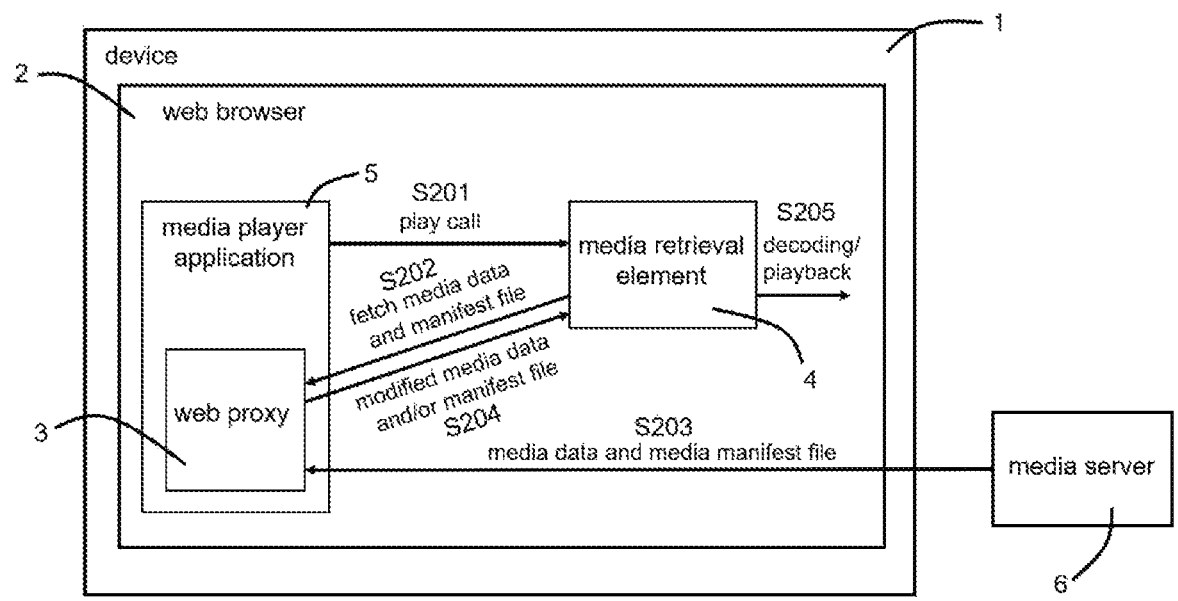
FIG. 4 illustrates a further example of a configuration of elements in a device having implemented a web browser configured to receive instructions for executing a method for processing of media data for playback and a media server.

Referring to the example of FIG. 4, the media player application, 5, and the media retrieval element, 4, may be individually implemented within the web browser, 2. The web proxy, 3, may be part of the media player application, 5. For example, in case the web proxy, 3, has been delivered together with the media player application, 5.

In the examples of FIGS. 2-4, a play call, 201, is initiated from the media player application, 5, to the media retrieval element, 4. Upon this play call, the media retrieval element, 4, initiates, 202, the web proxy, 3, which has been assigned a localhost address to act as a server for the media retrieval element, 4, to fetch, 203, a media manifest file and media data from the at least one media server, 6. The web proxy, 3, then modifies the media manifest file and/or the media data and provides, 204, the media manifest file and the media data as modified to the media retrieval element, 4, for receiving and processing the media manifest file and the media data for decoding or playback, 205.

Figure 5:
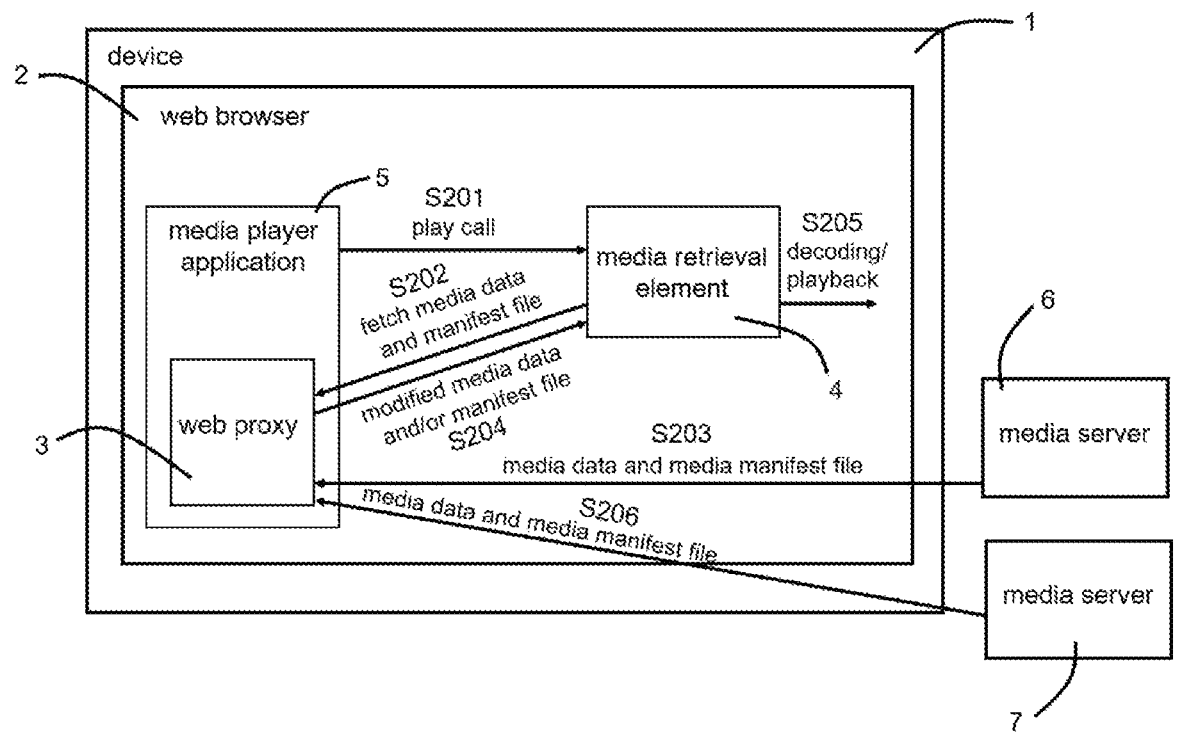
FIG. 5 illustrates a further example of a configuration of elements in a device having implemented a web browser configured to receive instructions for executing a method for processing of media data for playback and two media servers.

Referring to the example of FIG. 5, the same configuration of the web proxy, 3, the media player application, 5, and the media retrieval element, 4, in the web browser, 2, as in FIG. 4 is realized including steps 201, 202, 204 and 205. However, in this example, the web proxy, 3, fetches, 203, 206, a media manifest file and media data from two media servers, 6, 7, to subsequently merge the media data. The web proxy may further modify the respective media manifest files and/or the merged media data. While in FIG. 5 the configuration of the above elements in the device, 1, is the same as in the example of FIG. 4, also other configurations are conceivable, e.g. the configurations of FIGS. 2 and 3.

In an embodiment, the web browser may be configured to interpret and execute JavaScript, wherein the downloaded elements are implemented in JavaScript.

When implemented in JavaScript, security related constraints around WebSockets may occur. In an embodiment, a ServiceWorker concept may then be used to implement the web proxy. In general, a service worker (being an API) is a script that a browser runs in the background, separate from a web page, opening a door to features that do not need a web page or user interaction. Nowadays, service workers already include features like push notifications and background sync. The core feature of service workers is their ability to intercept and handle network requests, including programmatically managing a cache of responses. In this, service workers allow supporting offline experiences giving developers complete control over the experience. While a JavaScript worker cannot access the DOM directly, a service worker can communicate with the pages it controls by responding to messages sent via the postMessage interface, and those pages can manipulate the DOM if needed. Service worker is a programmable network proxy allowing to control how network requests from a page are handled. Service worker is terminated when not in use, and restarted when it is next needed, so it cannot be relied upon global state within a service worker's onfetch and onmessage handlers. If there is information needed to persist and to be reused across restarts, service workers do have access to the IndexedDB API. Service workers moreover make extensive use of promises.

Interpretation

Unless specifically stated otherwise, as apparent from the following discussions, it is appreciated that throughout the disclosure discussions utilizing terms such as "processing," "computing," "calculating," "determining", analyzing" or the like, refer to the action and/or processes of a computer or computing system, or similar electronic computing devices, that manipulate and/or transform data represented as physical, such as electronic, quantities into other data similarly represented as physical quantities.

In a similar manner, the term "processor" may refer to any device or portion of a device that processes electronic data, e.g., from registers and/or memory to transform that electronic data into other electronic data that, e.g., may be stored in registers and/or memory. A "computer" or a "computing machine" or a "computing platform" may include one or more processors.

The methodologies described herein are, in one example embodiment, performable by one or more processors that accept computer-readable (also called machine-readable) code containing a set of instructions that when executed by one or more of the processors carry out at least one of the methods described herein. Any processor capable of executing a set of instructions (sequential or otherwise) that specify actions to be taken are included. Thus, one example is a typical processing system that includes one or more processors. Each processor may include one or more of a CPU, a graphics processing unit, and a programmable DSP unit. The processing system further may include a memory subsystem including main RAM and/or a static RAM, and/or ROM. A bus subsystem may be included for communicating between the components. The processing system further may be a distributed processing system with processors coupled by a network. If the processing system requires a display, such a display may be included, e.g., a liquid crystal display (LCD) or a cathode ray tube (CRT) display. If manual data entry is required, the processing system also includes an input device such as one or more of an alphanumeric input unit such as a keyboard, a pointing control device such as a mouse, and so forth. The processing system may also encompass a storage system such as a disk drive unit. The processing system in some configurations may include a sound output device, and a network interface device. The memory subsystem thus includes a computer-readable carrier medium that carries computer-readable code (e.g., software) including a set of instructions to cause performing, when executed by one or more processors, one or more of the methods described herein. Note that when the method includes several elements, e.g., several steps, no ordering of such elements is implied, unless specifically stated. The software may reside in the hard disk, or may also reside, completely or at least partially, within the RAM and/or within the processor during execution thereof by the computer system. Thus, the memory and the processor also constitute computer-readable carrier medium carrying computer-readable code. Furthermore, a computer-readable carrier medium may form, or be included in a computer program product.

In alternative example embodiments, the one or more processors operate as a standalone device or may be connected, e.g., networked to other processor(s), in a networked deployment, the one or more processors may operate in the capacity of a server or a user machine in server-user network environment, or as a peer machine in a peer-to-peer or distributed network environment. The one or more processors may form a personal computer (PC), a tablet PC, a Personal Digital Assistant (PDA), a cellular telephone, a web appliance, a network router, switch or bridge, or any machine capable of executing a set of instructions (sequential or otherwise) that specify actions to be taken by that machine.

Note that the term "machine" shall also be taken to include any collection of machines that individually or jointly execute a set (or multiple sets) of instructions to perform any one or more of the methodologies discussed herein.

Thus, one example embodiment of each of the methods described herein is in the form of a computer-readable carrier medium carrying a set of instructions, e.g., a computer program that is for execution on one or more processors, e.g., one or more processors that are part of web server arrangement. Thus, as will be appreciated by those skilled in the art, example embodiments of the present disclosure may be embodied as a method, an apparatus such as a special purpose apparatus, an apparatus such as a data processing system, or a computer-readable carrier medium, e.g., a computer program product. The computer-readable carrier medium carries computer readable code including a set of instructions that when executed on one or more processors cause the processor or processors to implement a method. Accordingly, aspects of the present disclosure may take the form of a method, an entirely hardware example embodiment, an entirely software example embodiment or an example embodiment combining software and hardware aspects. Furthermore, the present disclosure may take the form of carrier medium (e.g., a computer program product on a computer-readable storage medium) carrying computer-readable program code embodied in the medium.

The software may further be transmitted or received over a network via a network interface device. While the carrier medium is in an example embodiment a single medium, the term "carrier medium" should be taken to include a single medium or multiple media (e.g., a centralized or distributed database, and/or associated caches and servers) that store the one or more sets of instructions. The term "carrier medium" shall also be taken to include any medium that is capable of storing, encoding or carrying a set of instructions for execution by one or more of the processors and that cause the one or more processors to perform any one or more of the methodologies of the present disclosure. A carrier medium may take many forms, including but not limited to, non-volatile media, volatile media, and transmission media. Non-volatile media includes, for example, optical, magnetic disks, and magneto-optical disks. Volatile media includes dynamic memory, such as main memory. Transmission media includes coaxial cables, copper wire and fiber optics, including the wires that comprise a bus subsystem. Transmission media may also take the form of acoustic or light waves, such as those generated during radio wave and infrared data communications. For example, the term "carrier medium" shall accordingly be taken to include, but not be limited to, solid-state memories, a computer product embodied in optical and magnetic media; a medium bearing a propagated signal detectable by at least one processor or one or more processors and representing a set of instructions that, when executed, implement a method; and a transmission medium in a network bearing a propagated signal detectable by at least one processor of the one or more processors and representing the set of instructions.

It will be understood that the steps of methods discussed are performed in one example embodiment by an appropriate processor (or processors) of a processing (e.g., computer) system executing instructions (computer-readable code) stored in storage. It will also be understood that the disclosure is not limited to any particular implementation or programming technique and that the disclosure may be implemented using any appropriate techniques for implementing the functionality described herein. The disclosure is not limited to any particular programming language or operating system.

Reference throughout this disclosure to "one example embodiment", "some example embodiments" or "an example embodiment" means that a particular feature, structure or characteristic described in connection with the example embodiment is included in at least one example embodiment of the present disclosure. Thus, appearances of the phrases "in one example embodiment", "in some example embodiments" or "in an example embodiment" in various places throughout this disclosure are not necessarily all referring to the same example embodiment. Furthermore, the particular features, structures or characteristics may be combined in any suitable manner, as would be apparent to one of ordinary skill in the art from this disclosure, in one or more example embodiments.

As used herein, unless otherwise specified the use of the ordinal adjectives "first", "second", "third", etc., to describe a common object, merely indicate that different instances of like objects are being referred to and are not intended to imply that the objects so described must be in a given sequence, either temporally, spatially, in ranking, or in any other manner.

In the claims below and the description herein, any one of the terms comprising, comprised of or which comprises is an open term that means including at least the elements/features that follow, but not excluding others. Thus, the term comprising, when used in the claims, should not be interpreted as being limitative to the means or elements or steps listed thereafter. For example, the scope of the expression a device comprising A and B should not be limited to devices consisting only of elements A and B. Any one of the terms including or which includes or that includes as used herein is also an open term that also means including at least the elements/features that follow the term, but not excluding others. Thus, including is synonymous with and means comprising.

It should be appreciated that in the above description of example embodiments of the disclosure, various features of the disclosure are sometimes grouped together in a single example embodiment, Fig., or description thereof for the purpose of streamlining the disclosure and aiding in the understanding of one or more of the various inventive aspects. This method of disclosure, however, is not to be interpreted as reflecting an intention that the claims require more features than are expressly recited in each claim. Rather, as the following claims reflect, inventive aspects lie in less than all features of a single foregoing disclosed example embodiment. Thus, the claims following the Description are hereby expressly incorporated into this Description, with each claim standing on its own as a separate example embodiment of this disclosure.

Furthermore, while some example embodiments described herein include some but not other features included in other example embodiments, combinations of features of different example embodiments are meant to be within the scope of the disclosure, and form different example embodiments, as would be understood by those skilled in the art. For example, in the following claims, any of the claimed example embodiments can be used in any combination.

In the description provided herein, numerous specific details are set forth. However, it is understood that example embodiments of the disclosure may be practiced without these specific details. In other instances, well-known methods, structures and techniques have not been shown in detail in order not to obscure an understanding of this description.

Thus, while there has been described what are believed to be the best modes of the disclosure, those skilled in the art will recognize that other and further modifications may be made thereto without departing from the spirit of the disclosure, and it is intended to claim all such changes and modifications as fall within the scope of the disclosure. For example, any formulas given above are merely representative of procedures that may be used. Functionality may be added or deleted from the block diagrams and operations may be interchanged among functional blocks. Steps may be added or deleted to methods described within the scope of the present disclosure.

Various aspects of the present invention may be appreciated from the following enumerated example embodiments (EEEs):

1. A method for processing of media data for playback, wherein the method includes the steps of:
   (a) fetching, by a web proxy, from at least one media server media data and a media manifest file including metadata information relating to the fetched media data;
   (b) modifying, by said web proxy, the content of the media manifest file and/or the content of the media data; and
   (c) providing, by said web proxy, the media manifest file and the media data as modified in step (b) for decoding or playback.

2. Method according to EEE 1, wherein in step (c) the web proxy provides the media manifest file and the media data as modified in step (b) to a media retrieval element for receiving and processing the media manifest file and the media data for decoding or playback, wherein a localhost address is assigned to the web proxy and the web proxy acts as a server for said media retrieval element, and wherein in step (a) fetching, by the web proxy, from the at least one media server the media data and the media manifest file is initiated by a play call from a media player application to the media retrieval element.

3. Method according to EEE 1 or EEE 2, wherein the web proxy is implemented in JavaScript.

4. Method according to EEE 2 or EEE 3, wherein the web proxy is part of the media player application.

5. Method according to any of EEEs 1-4, wherein the method further includes analyzing the media data by said web proxy, and wherein modifying the content of the media manifest file is based on a result of the analysis.

6. Method according to EEE 5, wherein analyzing the media data includes reading and/or fragmenting the media data, and wherein modifying the content of the media manifest file includes (auto-)generating a new media manifest file and replacing the fetched media manifest file by the new media manifest file.

7. Method according to any of EEEs 1-6, wherein modifying the content of the media data includes editing information on a media initialization segment, wherein said media initialization segment contains information required for the initialization of a decoder.

8. Method according to any of EEEs 1-7, wherein modifying the content of the media manifest file includes rewriting the media manifest file.

9. Method according to any of EEEs 1-8, wherein the media manifest file includes information linking portions of the media data to one or more personalization settings.

10. Method according to EEE 9, wherein modifying the content of the media manifest file is based on a selection of the one or more personalization settings.

11. Method according to EEE 10, wherein the personalization settings include one or more of a setting relating to language, a setting relating to personalized advertising, a setting relating to content-specific commentary, a setting relating to audio description for visually-impaired, a setting relating to other accessibility related features, and a setting relating to balancing of dialogue versus non-dialogue audio.

12. Method according to EEE 10 or EEE 11, wherein the selection of the one or more personalization settings is based on a user input.

13. Method according to any of EEEs 1-12, wherein the method includes fetching, by said web proxy, media data from two or more media servers and merging the media data.

14. Method according to any of EEEs 1-13, wherein the media data is present in MPEG-H Audio format or AC-4 format.

15. A device having implemented a web browser, wherein the web browser is configured to receive instructions to execute the method according to any one of EEEs 1-14.

16. Device according to EEE 15, wherein to receive instructions includes to download from the web elements including one or more of the web proxy, the media retrieval element and the media player application.

17. Device according to EEE 15 or EEE 16, wherein the web browser is configured to interpret and execute JavaScript, and wherein the downloaded elements are implemented in JavaScript.

18. Device according to any of EEEs 15-17, wherein the web browser is configured to implement the media retrieval element.

19. Device according to any of EEEs 15-18, wherein the web browser is configured to implement the web proxy.

20. Computer program product with instructions adapted to cause a device having processing capability to carry out the method according to any one of EEEs 1 to 14.

The invention claimed is:

1. A method for processing of media data for playback, wherein the method includes the steps of:
(a) fetching, by a web proxy, from two or more media servers, two or more streams of media data and respective media manifest files, wherein each media manifest file includes metadata information relating to the corresponding fetched media data, and merging, by the web proxy, two or more streams of media data into a single stream of media data;
(b) modifying, by said web proxy, content of at least one media manifest file and/or content of the merged media data; and
(c) providing, by said web proxy, the at least one media manifest file and the merged media data as modified in step (b) to a media retrieval element for receiving and processing the at least one media manifest file and the merged media data for decoding or playback,
wherein the step (a) is initiated by a play call from a media player application to the media retrieval element,
wherein the web proxy is implemented within a web browser.

2. The method according to claim 1, wherein the web proxy is implemented in JavaScript.

3. The method according to claim 2, wherein a Service-Worker concept is used to implement the web proxy.

4. The method according to claim 1, wherein the web proxy is part of the media player application.

5. The method according to claim 1, wherein the method further includes analyzing the merged media data by said web proxy, and wherein modifying the content of the at least one media manifest file is based on a result of the analysis.

6. The method according to claim 5, wherein analyzing the merged media data includes reading and/or fragmenting the merged media data, and wherein modifying the content of the at least one media manifest file includes (auto-)generating at least one new media manifest file and replacing the fetched at least one media manifest file by the at least one new media manifest file.

7. The method according to claim 1, wherein modifying the content of the merged media data includes editing information on a media initialization segment, wherein said media initialization segment contains information required for initialization of a decoder.

8. The method according to claim 1, wherein modifying the content of the at least one media manifest file includes rewriting the at least one media manifest file.

9. The method according to claim 1, wherein the at least one media manifest file includes information linking portions of the merged media data to one or more personalization settings.

10. The method according to claim 9, wherein modifying the content of the at least one media manifest file is based on a selection of the one or more personalization settings.

11. The method according to claim 10, wherein the personalization settings include one or more of a setting relating to language, a setting relating to personalized advertising, a setting relating to content-specific commentary, a setting relating to audio description for visually-impaired, a setting relating to other accessibility related features, and a setting relating to balancing of dialogue versus non-dialogue audio.

12. The method according to claim 11, wherein the selection of the one or more personalization settings is based on a user input.

13. The method according to claim 1, wherein each stream of media data is present in MPEG-H Audio format or AC-4 format.

14. The method according to claim 10, wherein the personalization settings include one or more of a setting relating to language, a setting relating to content-specific commentary, a setting relating to audio description for visually-impaired, a setting relating to other accessibility related features, and a setting relating to balancing of dialogue versus non-dialogue audio.

15. The method according to claim 1 wherein the media player application, the media retrieval element, and the web proxy are all implemented within the web browser.

16. An apparatus comprising:
one or more processors, configured to:
(a) fetch, by a web proxy, two or more streams of media data and respective media manifest files, wherein each media manifest file includes metadata information relating to the corresponding fetched media data, and merging, by the web proxy, two or more streams of media data into a single stream of media data;
(b) modify, by the web proxy, content of at least one media manifest file and/or content of the merged media data; and
(c) provide, by the web proxy, the at least one media manifest file and the merged media data to a media retrieval element for receiving and processing the at least one media manifest file and the merged media data for decoding or playback,
wherein the step (a) is initiated by a play call from a media player application to the media retrieval element,
wherein the media player application is implemented within a web browser.

17. The apparatus according to claim 16, the one or more processors are further configured to interpret and execute JavaScript, and wherein the web proxy is implemented in JavaScript.

18. The apparatus according to claim 16, wherein the media player application, the media retrieval element, and the web proxy are all implemented within the web browser.

19. A non-transitory computer program product with instructions adapted to cause a device having processing capability to carry out the method according to claim 1.

20. A method for processing of media data for playback, wherein the method includes the steps of:
(a) fetching, by a web proxy, from two or more media servers, two or more streams of media data and respective media manifest files, wherein each media manifest file includes metadata information relating to the corresponding fetched media data, and merging, by the web proxy, two or more streams of media data into a single stream of media data;
(b) modifying, by said web proxy, content of at least one media manifest file and/or content of the merged media data; and
(c) providing, by said web proxy, the at least one media manifest file and the merged media data as modified in step (b) to a media retrieval element for receiving and processing the at least one media manifest file and the merged media data for decoding or playback,
wherein the step (a) is initiated by a play call from a media player application to the media retrieval element,
wherein the media retrieval element is implemented within a web browser.

21. The method according to claim 20, wherein the media retrieval element and the web proxy are both implemented within the web browser.

* * * * *